United States Patent
Chien et al.

(10) Patent No.: US 7,595,205 B2
(45) Date of Patent: Sep. 29, 2009

(54) USING REVERSE ARRANGEMENT FOR TREND TEST IN STATISTICAL PROCESS CONTROL FOR MANUFACTURE OF SEMICONDUCTOR INTEGRATED CIRCUITS

(75) Inventors: Wei-Ting Kary Chien, Shanghai (CN); Siyuan Frank Yang, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 304 days.

(21) Appl. No.: 11/498,970

(22) Filed: Aug. 2, 2006

(65) Prior Publication Data

US 2007/0231933 A1 Oct. 4, 2007

(30) Foreign Application Priority Data

Mar. 28, 2006 (CN) .................. 2006 1 0025382

(51) Int. Cl.
 *H01L 21/66* (2006.01)
(52) U.S. Cl. .................. 438/14; 257/48; 257/E21.521
(58) Field of Classification Search .................. 438/15, 438/14; 257/48, E21.521; 700/108–121; 702/81
See application file for complete search history.

(56) References Cited

U.S. PATENT DOCUMENTS 7,221,991 B2 * 5/2007 Matsushita et al. .......... 700/110

OTHER PUBLICATIONS

Ansell and Phillips, "Test Trends." Practical Methods for Reliability Data Analysis. *Oxford Statistical Science Series*, Oxford Clarendon Press, Ch. 6, p. 142-144, 1994.
Cox and Stuart, "Some Quick Tests for Trend in Location and Dispersion." *Biometrika*, vol. 42, pp. 80-95, 1955.
Daniels, "Rank Correlation and Popular Models." *Journal of the Royal Statistical Society(B)*, 12, pp. 171-181, 1950.
Kendall, "A New Measure of Rank Correlation." *Biometrika*, vol. 30, pp. 81-93, Jun. 1938.

(Continued)

*Primary Examiner*—Quoc D Hoang
(74) *Attorney, Agent, or Firm*—Townsend and Townsend and Crew LLP

(57) ABSTRACT

A method for manufacturing semiconductor devices or other types of devices and/or entities. The method includes providing a process (e.g., etching, deposition, implantation) associated with a manufacture of a semiconductor device/ The method includes collecting a plurality information (e.g., data) having a non-monotonic trend of at least one parameter associated with the process over a determined period. The method includes processing the plurality of information having the non-monotonic trend. The method includes detecting an increasing or a decreasing trend from the processed plurality of information having the non-monotonic trend. The method includes performing an action based upon at least the detected increasing or decreasing trend.

20 Claims, 10 Drawing Sheets

OTHER PUBLICATIONS

Mann, "Nonparametric Tests Against Trend." *Econometrica*, vol. 13, No. 3, pp. 245-259, Jul. 1945.

Nelson, "The Shewhart Control Chart—Test of Special Causes." *Journal of Quality Technology*, vol. 16, No. 4, pp. 237-239, 1984.

Brooks Automation, "Statistical Process Control Server (SPCsrv)," CELLworks Version 5.2, A FASTech MES Product, 2000, pp. 2-48 to 2-50, Brooks Automation, Chelmsford MA.

Kendall, Maurice G., et al., "The Advanced Theory of Statistics, Inference and Relationship", 1961, vol. 2, pp. 483-486, Charles Griffin & Company Limited, London, England.

Shewhart, Walter, et al., "Statistical Method from the Viewpoint of Quality Control", 1939, Ch. 1, pp. 1-49, The Graduate School, The Department of Agriculture, Washington, D.C.

Smith, Gerald M., "Statistical Process Control and Quality Improvement", 2001, pp. 394-398, Fourth Edition, Prentice Hall, Upper Saddle River, New Jersey.

Western Electric Co., Inc., "Statistical Quality Control Handbook",1984, pp. 23-28, Second Edition, Tenth Printing, Western Electric Co., Inc., Indianapolis, Indiana.

\* cited by examiner

Table 1

| | | Values of Σ | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Values of N | 1 | 1 | | | | | | | | | | | | | | | |
| | 2 | 0 | 1 | | | | | | | | | | | | | | |
| | 3 | 0 | 2 | 0 | 1 | | | | | | | | | | | | |
| | 4 | 6 | 0 | 5 | 0 | 3 | 0 | 1 | | | | | | | | | |
| | 5 | 22 | 0 | 20 | 0 | 15 | 0 | 9 | 0 | 4 | 0 | 1 | | | | | |
| | 6 | 0 | 101 | 0 | 90 | 0 | 71 | 0 | 49 | 0 | 29 | 0 | 14 | 0 | 5 | 0 | 1 |

Figure 2

Table 2. Probability of Obtaining a Permutation with $R \leq \overline{R}$ in Permutations of N Variables

| | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| Values of N | 3 | 0.167 | 0.500 | 0.833 | | | | | | | | | | | | | |
| | 4 | 0.042 | 0.167 | 0.375 | 0.625 | 0.833 | 0.958 | | | | | | | | | | |
| | 5 | 0.008 | 0.042 | 0.117 | 0.242 | 0.408 | 0.592 | 0.758 | 0.883 | 0.958 | 0.992 | | | | | | |
| | 6 | 0.001 | 0.008 | 0.028 | 0.068 | 0.136 | 0.235 | 0.360 | 0.500 | 0.500 | 0.640 | 0.765 | 0.864 | 0.932 | 0.972 | 0.992 | 0.999 |

Figure 3

Table 4. Minimum and Maximum R and their corresponding p-value and confidence level for up trend and down trend test for N = 6 to 12.

| N | Min R for up trend | p-value | Conf. level | Max R for down trend | p-value | Conf. level |
|---|---|---|---|---|---|---|
| 6 | 15 | 0.00139 | 99.8610% | 0 | 0.00139 | 99.8610% |
| 7 | 20 | 0.00139 | 99.8610% | 1 | 0.00139 | 99.8610% |
| 8 | 26 | 0.00087 | 99.9130% | 2 | 0.00087 | 99.9130% |
| 9 | 32 | 0.00121 | 99.8790% | 4 | 0.00121 | 99.8790% |
| 10 | 39 | 0.00111 | 99.8890% | 6 | 0.00111 | 99.8890% |
| 11 | 47 | 0.000795 | 99.9205% | 8 | 0.000795 | 99.9205% |
| 12 | 55 | 0.000901 | 99.9099% | 11 | 0.000901 | 99.9099% |

Figure 4

Control Chart

The following example shows the power of the RAT tests.

Fig. 5 The control chart for Example 3

Fig. 6 The SiN thickness monitor for Example 4

Fig 7. Applying RAT on iso-EM WLRC $T_{50\%}$ trend tests (Example 5)

Fig. 8. The flow chart of our proposed RAT heuristic

USING REVERSE ARRANGEMENT FOR TREND TEST IN STATISTICAL PROCESS CONTROL FOR MANUFACTURE OF SEMICONDUCTOR INTEGRATED CIRCUITS

CROSS-REFERENCES TO RELATED APPLICATIONS

This application claims priority to Chinese Application No. 200610025382.9; filed on Mar. 28, 2006; commonly assigned, and of which is hereby incorporated by reference for all purposes.

COPYRIGHT NOTICE

Certain portions of the present specification include computer codes, where notice is hereby given. All rights have been reserved under Copyright for such computer codes, by ©2004 and 2005 Semiconductor Manufacturing International (Shanghai) Corporation, which is the present assignee.

BACKGROUND OF THE INVENTION

The present invention is directed to integrated circuits and their processing for the manufacture of semiconductor devices. In particular, the invention provides a method and system for monitoring and controlling process related information for the manufacture of semiconductor integrated circuit devices. More particularly, the invention provides a method and system using a reverse arrangement process for a trend test(s) for statistical process control used in the manufacture of semiconductor integrated circuit devices. But it would be recognized that the invention has a much broader range of applicability.

Integrated circuits have evolved from a handful of interconnected devices fabricated on a single chip of silicon to millions of devices. Conventional integrated circuits provide performance and complexity far beyond what was originally imagined. In order to achieve improvements in complexity and circuit density (i.e., the number of devices capable of being packed onto a given chip area), the size of the smallest device feature, also known as the device "geometry", has become smaller with each generation of integrated circuits.

Increasing circuit density has not only improved the complexity and performance of integrated circuits but has also provided lower cost parts to the consumer. An integrated circuit or chip fabrication facility can cost hundreds of millions, or even billions, of U.S. dollars. Each fabrication facility will have a certain throughput of wafers, and each wafer will have a certain number of integrated circuits on it. Therefore, by making the individual devices of an integrated circuit smaller, more devices may be fabricated on each wafer, thus increasing the output of the fabrication facility. Making devices smaller is very challenging, as each process used in integrated fabrication has a limit. That is to say, a given process typically only works down to a certain feature size, and then either the process or the device layout needs to be changed. Additionally, as devices require faster and faster designs, process limitations exist with certain conventional processes, including monitoring techniques, materials, and even testing techniques.

An example of such processes include ways of monitoring process related functions during the manufacture of integrated circuits, commonly called semiconductor devices. Such monitoring process is often desired for continuously improving quality and productivity to stay competitive. As merely an example, statistical process control (SPC) has been playing an important role in conventional industries. It is a procedure in which data are collected, organized, analyzed and interpreted. Actions are requested to identify root causes and to implement solutions so a process can be maintained at its desired level or be improved to a higher level. SPC makes use of statistical signals to identify sources of variation, to correct identified variation causes therefore to improve performance, and to maintain control of processes. Variations are classified as common (random or chance) and special (or assignable) causes in general [1]. Common causes denote the many sources of variation within a process that is in statistical control. Special causes refer to any factors causing variation that cannot be adequately explained by a single distribution. A process in statistical control operates with less variability than a process having special causes. Unless all the special causes of variance are identified and corrected, they will continue to affect the process outputs in unpredictable and undesirable ways.

Control charts (which are trend charts with control limits) are often used to monitor selected parameters, which have important quality characteristics. Various run tests have been developed to identify if there is any pattern in the data points. Western Electric developed five run tests [2]; they are 1) 1 point beyond 3 sigma, 2) 2 out 3 successive points beyond 2 sigma, 3) 4 out of 5 successive points beyond 1 sigma, 4) 15 successive points not within 1 sigma of center line, and 5) 8 successive points on the same side and not within 1 sigma of center line. Later in about 1986, Nelson developed additional 3 rules [3]: 1) 9 successive points on same side of center line, 2) 6 successive points steadily increasing or decreasing, and 3) 14 successive points alternating up and down.

The run test of 6 consecutive points increasing or decreasing, proposed by Nelson is a special test of the trend pattern, indicating an instable process. It is usually assumed that the change will be monotonic and is either increasing or decreasing over time. The ease of such monotonic trend test becomes popular due to the practical values. However, this test obviously cannot detect all possible trends and we should be aware that the change may be non-monotonic (i.e., fluctuating). Other limitations also exist with these conventional techniques. These and other limitations are described throughout the present specification and more particularly below.

From the above, it is seen that an improved technique for manufacturing semiconductor devices is desired.

BRIEF SUMMARY OF THE INVENTION

According to the present invention, techniques directed to integrated circuits and their processing for the manufacture of semiconductor devices are provided. In particular, the invention provides a method and system for monitoring and controlling process related information for the manufacture of semiconductor integrated circuit devices. More particularly, the invention provides a method and system using a reverse arrangement process for a trend test(s) for statistical process control used in the manufacture of semiconductor integrated circuit devices. But it would be recognized that the invention has a much broader range of applicability.

In further background, we identified that other forms of tends such as non-monotonic trends from, for example, parts wearing-out, and other physical conditions, and the like. The present method and system uses a powerful and special test called "Reverse Arrangement Test" (RAT) to identify monotonic as well as non-monotonic increasing or decreasing trends for any possible number (>=6) of points under test according to a specific embodiment. As merely example, we have also provided cases that reported using the RAT test to show its contributions.

In a specific embodiment, the present invention provides a method for manufacturing semiconductor devices or other types of devices and/or entities. The method includes providing a process (e.g., etching, deposition, implantation) associated with a manufacture of a semiconductor device/The method includes collecting a plurality information (e.g., data) having a non-monotonic trend of at least one parameter associated with the process over a determined period. The method includes processing the plurality of information having the non-monotonic trend. The method includes detecting an increasing or a decreasing trend from the processed plurality of information having the non-monotonic trend. The method includes performing an action based upon at least the detected increasing or decreasing trend.

In an alternative specific embodiment, the present invention provides a system for manufacturing semiconductor devices. In a preferred embodiment, the system has one or more memories, e.g., hard disk drives, random access memory, Flash memories, static memories. Various computer codes are provided to carry out functionality described herein. The system has one or more codes directed to initiating a process associated with a manufacture of a semiconductor device. The system also has one or more codes directed to collecting a plurality information having a non-monotonic trend of at least one parameter associated with the process over a determined period. The system has one or more codes directed to processing the plurality of information having the non-monotonic trend. One or more codes is also directed to detecting an increasing or a decreasing trend from the processed plurality of information having the non-monotonic trend. One or more codes is directed to outputting a code to perform an action based upon at least the detected increasing or decreasing trend.

Additionally, one or more limitations of conventional trend test in SPC practice has also been identified. The six consecutive increasing or decreasing points cannot detect non-monotonic increasing or decreasing trend, which is frequently encountered in practice, as we have identified. In a specific embodiment, the present method and system provides a RAT (reverse arrangement test) test to replace, at least in part and/or supplement, conventional SPC trend test rule in order to detect non-monotonic increasing or decreasing trends. A theory of RAT is reviewed and we point out the errors in the tables from a well-known and most frequently referenced paper on RAT by Mann [5]. The corrected tables of accumulated probability for each total reverse arrangement for n=3 to 12 are presented. For the first time in literature, we illustrate a flaw of RAT for observations with identical values and propose to check tied data before applying RAT. Examples show that 7 non-monotonic increasing points can only be detected by RAT, while none of the current WECO rules can detect such abnormal pattern. Applications of RAT in IC SPC and WLRC (Wafer Level Reliability Control) show RAT is more sensitive than conventional monotonic trend tests. Further details of the present invention can be found throughout the present specification and more particularly below.

In a specific embodiment, the invention can also include one or more of the following features.

1. A method (RAT) to replace the monotonic trend test in conventional SPC practice according to a specific embodiment. The RAT not only detects monotonic trend but also for non-monotonic trend.

2. A heuristic is presented by a flow chart for the proposed RAT procedure for its application in semiconductor SPC according to an alternative embodiment of the present invention. We also depict the disposition on tied data.

3. The method and system also introduced a table on critical R for up or down trend test for practical use according to yet an alternative embodiment of the present invention. However, different false alarm rate criteria could be used and the table can be changed accordingly.

4. In an alternative embodiment, the present method and system can be used to correct the error on accumulated probability for a certain R in Table 1 of the original paper by Mann [5].

As will be appreciated, the present method and system and related description herein are purely illustrative and are not to be limited with RAT. Many if not all tests of randomness available in statistical literature can be used to serve to detect non-monotonic trends too, such as Cox-Stuart test (Cox and Stuart, Some Quick tests for trend in location and dispersion. Biometrika, 42, 80-95, 1955), and Daniels Test (Daniels, H. E. Rank Correlation and Population Models, Journal of the Royal Statistical Society (B), 12, 171-181, 1950). Of course, there can be other variations, modifications, and alternatives.

Many benefits are achieved by way of the present invention over conventional techniques. For example, the present technique provides an easy to use process that relies upon conventional technology. In some embodiments, the method provides higher device reliability and performance. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 2 is a table (Table 1) illustrating a frequency distribution of sigma for values of N from 1 to 6;

FIG. 3 is a table (Table 2) illustrating an accumulated frequency and corresponding probability for each R and signal;

FIG. 4 is a table (Table 4) listing minimum and maximum total reverse arrangements for up and down trend test and their corresponding p-values (i.e., the false alarm rate);

DETAILED DESCRIPTION OF THE INVENTION

Figure 1:
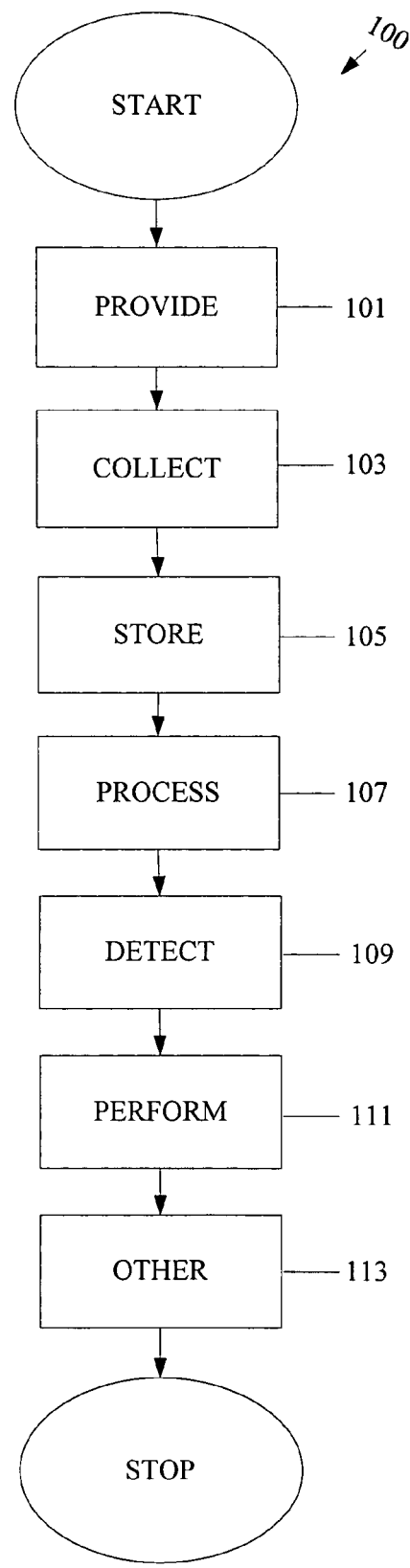
FIG. 1 is a simplified flow chart illustrating a method according to an embodiment of the present invention.

According to the present invention, techniques directed to integrated circuits and their processing for the manufacture of semiconductor devices are provided. In particular, the invention provides a method and system for monitoring and controlling process related information for the manufacture of semiconductor integrated circuit devices. More particularly, the invention provides a method and system using a reverse arrangement process for a trend test(s) for statistical process control used in the manufacture of semiconductor integrated circuit devices. But it would be recognized that the invention has a much broader range of applicability. Details of the present invention can be found throughout the present specification and more particularly below.

In a specific embodiment, the present invention provides a method for manufacturing semiconductor devices or other types of devices and/or entities, which has been identified below (See, FIG. 1).

1. Provide a process (e.g., etching, deposition, implantation) (Step 101) associated with a manufacture of a semiconductor device;
2. Collect (Step 103) a plurality of information (e.g., data) having a non-monotonic trend of at least one parameter associated with the process over a determined period;
3. Store (Step 105) the plurality of information in memory;
4. Process (Step 107) the plurality of information having the non-monotonic trend;
5. Detect (Step 109) an increasing or a decreasing trend from the processed plurality of information having the non-monotonic trend;
6. Perform (Step 111) an action based upon at least the detected increasing or decreasing trend; and
7. Perform (Step 113) other steps, as desired.

The above sequence of steps provides methods according to an embodiment of the present invention. As shown, the method uses a combination of steps including a way of performing a SPC process according to an embodiment of the present invention. Many other methods and system are also included. Of course, other alternatives can also be provided where steps are added, one or more steps are removed or repeated, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives. Before discussing specific aspects of the present invention, we have described in details of various conventional techniques that we have evaluated.

We understand that together with his famous correlation coefficient $\tau$ in Eq. (1), M. G. Kendall firstly introduced the concept of reverse arrangement in 1938 [4]. Kendall's $\tau$ was defined as:

$$\tau = \frac{\text{actual score} \sum}{\text{maximum possible score}} \qquad (1)$$

Kendall explained the "score" in Eq. (1) by a numerical example owith 10 arbitrary ranking numbers:
4 7 2 10 3 6 8 1 5 9

Score=+1 if the second number of a pair is greater than the first one. Score=−1 is then defined oppositely. Consider the first number, i.e., 4. There are 9 pairs for the remaining nine numbers associated with 4 and, by the definition on score, we have: (4, 7)→+1, (4, 2)→−1, (4, 10)→+1, (4, 3)→-1, (4, 6)→+1, (4, 8)→+1, (4, 1)→−1, (4, 5)−+1, and (4, 9)−+1. The sum of these nine scores is then: Σ(+1−1+1−1+1+1−1+1+1)=+3.

Consider the second number, i.e., 7. There are 8 pairs and the scores are (−1, +1, −1, −1, +1, −1, −1, +1). The sum is −2. Continue doing such scoring for the first nine numbers and the nine scores are (+3, −2, +5, −6, +3, 0, −1, +2, +1). The sum of these score is +5, which is the Σ in the numerator of Eq. (1). If the 10 numbers are in the ascending order (1, 2, 3, ..., 10), we obtain the maximum score 45, which is the denominator of Eq. (1). Therefore, the correlation coefficient $\tau$ is $$\tau = \frac{\text{actual score} \sum}{\text{maximum possible score}} = \frac{5}{45} = +0.11 \qquad (2)$$

The maximum possible score for n individuals is $$(n-1) + (n-2) + \ldots + 1 = \frac{n(n-1)}{2}.$$

Hence, we have $$\tau = \frac{\Sigma}{n(n-1)/2} \qquad (3)$$

In the same paper [4], Kendall introduced a convenient method for calculations by means of the reverse arrangement named later by Henry B. Mann [5]. From the set of observations $x_1, x_2, \ldots, x_N$, the reverse arrangement is defined as $$h_{ij} = \begin{cases} 1 & \text{if } x_i \langle x_j \\ 0 & \text{otherwise} \end{cases} \qquad (4)$$

Then $$R = \sum_{i=1}^{N-1} R_i \qquad (5)$$

where $$R_i = \sum_{j=i+1}^{N} h_{ij} \qquad (6)$$

In the same data set, that Kendall gave, (4, 7, 2, 10, 3, 6, 8, 1, 5, 9), for the first number, 4, there are six numbers on its right which are larger than it. For the second number, 7, there are three, and so on. Thus, the reverse arrangements $R_i$ so obtained by Eq. (6) are (6, 3, 6, 0, 4, 2, 1, 2, 1). Therefore, by Eq. (5), the total arrangement R=25 where the minimum & the maximum R is 0 and N(N−1)/2, respectively.

Kendall pointed out the relationship between the actual score Σ and the total reverse arrangement R is $$\Sigma = 2R - \frac{N(N-1)}{2} \qquad (7)$$

Kendall also derived the frequency distribution for the actual score Σ under the hypothesis of randomness of these N observations. For simplicity, only the frequency of N up to 6 from Kendall's Table 1 [4] is quoted in Table 1, which has been provided in FIG. 2. As shown, Table 1 illustrates a frequency distribution of Σ for values of N from 1 to 6 (only the positive half of the symmetrical distributions are shown; from Kandall's Table 1 [4])

Under the hypothesis of randomness, R is a random variable. Mann [7] proved its mean and variance as in Eq. (8) & (9), respectively.

$$\mu_R = \frac{N(N-1)}{4} \tag{8}$$

$$\sigma_R^2 = \frac{2N^3 + 3N^2 - 5N}{72} \tag{9}$$

Mann listed a table on the probability of obtaining a permutation with $R \leq \overline{R}$ in permutations of N variables for N=3, ..., 10. For simplicity, Mann's table with N=3, 4, 5, 6 is duplicated in Table 2, which has provided in FIG. 3.

For N equal or larger than 10, Mann derived Eq. (10) for the accumulated probability.

$$P(c) = \frac{1}{\sqrt{2\pi}} \int_{-\infty}^{-c} e^{-x^2/2} dx \tag{10}$$

where $$c = \left(\mu_R - R - \frac{1}{2}\right) / \sigma_R \text{ for } N \geq 10.$$

Mann's paper was referred by Kendall as the first one to recognize that a rank correlation statistic could be used to test randomness as well as independence [6]. Mann discussed the distribution of total reverse arrangement R and proved that the limit distribution of R is normal. The correctness of the tabulated values is important for the application on practical trend tests since many papers and books refereed to this original paper for calculations. The trend test is also widely used in reliability, e.g., for reparable systems, and Mann's RAT along with his tables are frequently referred by reliability statisticians (such as Ansell in his book, Ref. [7]). However, we found some errors in Mann's table (Table 1 of page 246 in Ref. [5]). The errors (the eight numbers for $R \geq 7$ when N=6) are shown in italic in Table 2. An obvious error of these is that it is supposed to be 1 when R=Rmax=15, not 0.999 because it shall include all possibilities. The value for $R \leq 8$ should not be the same for $R \leq 7$. And, the value for $R \leq 9$ in Mann's table should be for $R \leq 8$, and that for $R \leq 10$ should be for $R \leq 9$, and so on. For N=7, there are similar mistakes in Mann's original table (i.e., Table 1 of page 246 in Ref. [5]). We re-generate Mann's table for N up to 10 starting from the frequency of Σ given by Kendall's Table 1 and extend the table up to N=12 for both frequency of Σ (extending Kendall's table for n=10, 11, 12) and the accumulated probability for R (extending Mann's Table 1 of page 246). The newly generated tables are shown below for N=3 to 6, respectively, and the tables for N=7 to 12 are in Appendix. The numbers in boldface in Table 3 (for N=6) (see below) are the ones being corrected.

TABLE 3

The accumulated frequency and probability for each R and Σ with N = 3 to 6. The numbers in italic (R = 8 to 15, for N = 6) are what being corrected from Mann's Table 1.

| R | Σ | Prob. (t <= T) | Frequency of Σ | Accumulated Frequency |
|---|---|---|---|---|
| | | N = 3 | | |
| 0 | −3 | 0.16666667 | 1 | 6 |
| 1 | −1 | 0.50000000 | 2 | 1 |
| 2 | 1 | 0.83333333 | 2 | 3 |
| 3 | 3 | 1.00000000 | 1 | 5 |
| | | N = 4 | | |
| 0 | −6 | 0.04166667 | 1 | 1 |
| 1 | −4 | 0.16666667 | 3 | 4 |
| 2 | −2 | 0.37500000 | 5 | 9 |
| 3 | 0 | 0.62500000 | 6 | 15 |
| 4 | 2 | 0.83333333 | 5 | 20 |
| 5 | 4 | 0.95833333 | 3 | 23 |
| 6 | 6 | 1.00000000 | 1 | 24 |
| | | N = 5 | | |
| 0 | −10 | 0.00833333 | 1 | 1 |
| 1 | −8 | 0.04166667 | 4 | 5 |
| 2 | −6 | 0.11666667 | 9 | 14 |
| 3 | −4 | 0.24166667 | 15 | 29 |
| 4 | −2 | 0.40833333 | 20 | 49 |
| 5 | 0 | 0.59166667 | 22 | 71 |
| 6 | 2 | 0.75833333 | 20 | 91 |
| 7 | 4 | 0.88333333 | 15 | 106 |
| 8 | 6 | 0.95833333 | 9 | 115 |
| 9 | 8 | 0.99166667 | 4 | 119 |
| 10 | 10 | 1 | 1 | 120 |
| | | N = 6 | | |
| 0 | −15 | 0.00138889 | 1 | 1 |
| 1 | −13 | 0.00833333 | 5 | 6 |
| 2 | −11 | 0.02777778 | 14 | 20 |
| 3 | −9 | 0.06805556 | 29 | 49 |
| 4 | −7 | 0.13611111 | 49 | 98 |
| 5 | −5 | 0.23472222 | 71 | 169 |
| 6 | −3 | 0.35972222 | 90 | 259 |
| 7 | −1 | 0.50000000 | 101 | 360 |
| 8 | 1 | *0.64027778* | 101 | 461 |
| 9 | 3 | *0.76527778* | 90 | 551 |
| 10 | 5 | *0.86388889* | 71 | 622 |
| 11 | 7 | *0.93194444* | 49 | 671 |
| 12 | 9 | *0.97222222* | 29 | 700 |
| 13 | 11 | *0.99166667* | 14 | 714 |
| 14 | 13 | *0.99861111* | 5 | 719 |
| 15 | 15 | *1.00000000* | 1 | 720 |

Example 1 & 2 depict the trend tests using Table 3 above.

EXAMPLE 1

Consider eight observations: 1, 3, 2, 4, 5, 7, 6, and 8. By Eq. (5) & (6), we have Ri=(7, 5, 5, 4, 3, 1, 1), and total R=26. From the tables in Appendix, the probability when R is equal or higher than 26 is only 1−0.99913194=0.0008681. Therefore, we conclude there is 99.91% confidence that there is an increasing trend.

EXAMPLE 2

Is the reverse order of example 1. That is, the eight observations are (8, 6, 7, 5, 4, 2, 3, 1). We have Ri=(0, 1, 0, 0, 0, 1, 0) and total R=2. The total R can be obtained by another approach, i.e., Rmax−R (when originally ordered as in Example 1). We know Rmax=N(N−1)/2=8 (8−1)/2=28 and, therefore, the total R in Example 2 is =28−26 =2.

From the table in Appendix, the probability when R is equal to or lower than 2 is only 0.0008681 providing the null hypothesis of random variation is valid. Therefore, we have 99.91% confidence that there is a decreasing trend. In other words, the false alarm rate is only 0.08681%, which is much smaller than 5%. We have identified the above. Depending upon the embodiment, we have also provided application of RAT in SPC Run Tests, which have been explained more fully below.

The famous run test of 6 consecutive increasing or decreasing points, introduced by Nelson [3], has been widely used in SPC practices. However, Nelson did not provide the false alarm rate for this test, which is important for SPC practitioners. These 6 points include the base point (i.e., the first point) and, therefore, its false alarm rate is 0.00138889 according to the table for N=6 in Appendix. Some SPC practitioners use 7 consecutive points in their trend test, such as Brook Automation's SPC software FACTORYworks 2.4 [8]. The false alarm rate is even lower to be 0.00019841 from the table N=7 in Appendix. People have slightly different definition on the number of points under trend test. In Smith's SPC book [9], his 7 monotonic increasing or decreasing points do not include the first base point. That is, there are actually 8 points based on Nelson's definition [3] and the false alarm rate is pretty small (=0.0000248, from the table N=8 in Appendix while Smith gave the estimation of the upper limit of 0.008). A non-monotonic trend test for a particular case is introduced in Smith's SPC book [9]: 10 out 11 points are climbing or falling, whose false alarm rate is very small (=0.000902; whereas Smith only provided a rough estimation, 0.0054, in Ref. [9]). As we know, an accurate false alarm rate is very important for resources allocations. A too-high false alarm rate leads to unnecessary investment (on both time and cost) for troubleshooting. On other hand, a too-low false alarm rate results in insufficient sensitivity to detect nonconformance. For non-monotonic trend tests using RAT, we select the false alarm rate equal to or less than that of Nelson's 6 monotonic increasing or decreasing trend test (0.00139); this rate also meet the needs of most applications. Table 4 lists the minimum and maximum total reverse arrangements for up and down trend test and their corresponding p-values (i.e., the false alarm rate), See FIG. 4.

EXAMPLE 3

Figure 5:
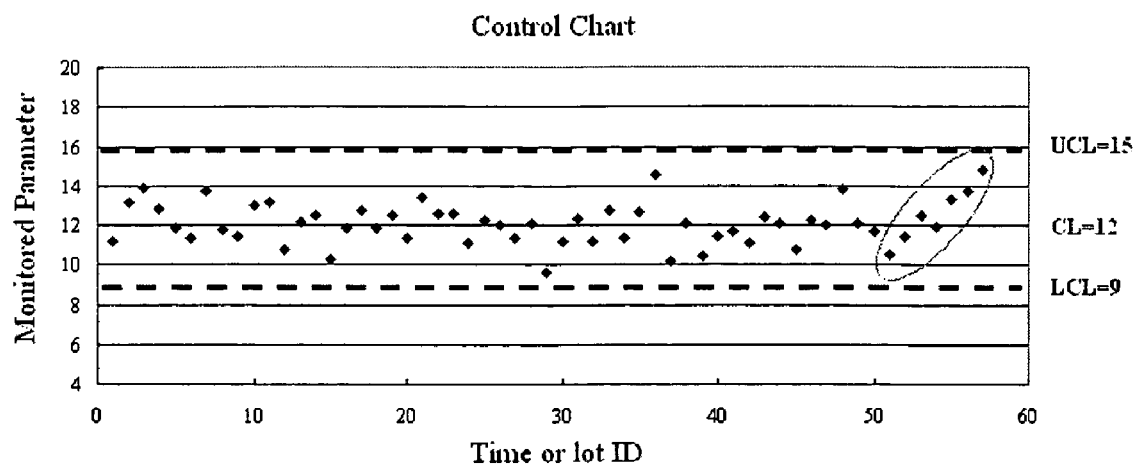
FIG. 5 is a simplified control chart for example 3 according to an embodiment of the present invention.

There are 57 points with central level at 12 and the 3-σ lower & upper control limits (LCL & UCL) at 9 & 15, respectively (See FIG. 5). The total reverse arrangement of the last 7 points is 20 and the false alarm rate is 0.1388. That is, we have 99.86% confidence there is an increasing trend from these 7 points, which cannot be detected by the conventional 6 monotonic increasing trend test since the third point in the circle makes the increasing trend non-monotonic. This control chart actually passes the following three run tests: 1) one point out of 3 sigma, 2) 2 of consecutive 3 points beyond 2 sigma, and 3) 4 of consecutive 5 points beyond 1 sigma. That is, a nonconformance is easily overlooked if we do not apply RAT tests.

EXAMPLE 4

Figure 6:
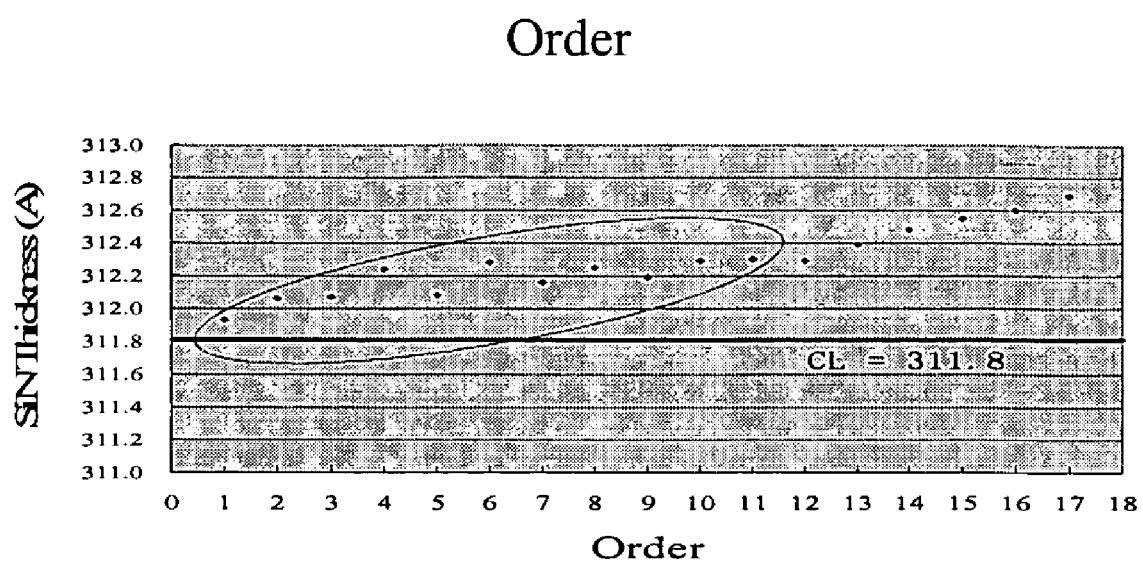
FIG. 6 is a simplified control chart for example 4 according to an embodiment of the present invention.

This example is a real case from IC manufacturing (See FIG. 6). A target 300 A SiN (silicon nitride) film is to be deposited by a DCVD (dielectrics chemical vapor deposition) tool. The film thickness is measured by a thin film metrology too and is monitored by an SPC chart. The metrology tool's Xe (Xenon) lamp light intensity happened to degrade gradually and hence affected SiN film thickness.

There are 17 points in FIG. 6 and the last 6 points constitute monotonic increasing trend, which can be detected by the traditional trend test. However, actually, such increasing trend should be detected much earlier from the first 11 points, which show a non-monotonic trend. The total reverse arrangement for the circled 11 points is 48 and the false alarm rate is 0.00038 (from table N=11 in Appendix). Without the RAT tests, the degraded Xe lamp light intensity cannot be detected much earlier as shown in this example. This may lead to serious low-yield events and scrap.

EXAMPLE 5

This example (See FIG. 7) gives the RAT application on WLRC (Wafer Level Reliability Control) in-line monitors. A periodical reliability test of iso-EM (isothermal electromigration) is to monitor metal performance. It is found that the latest 8 measured iso-EM lifetime data ($T_{50\%}$) have non-monotonic increasing trend.

Figure 7:
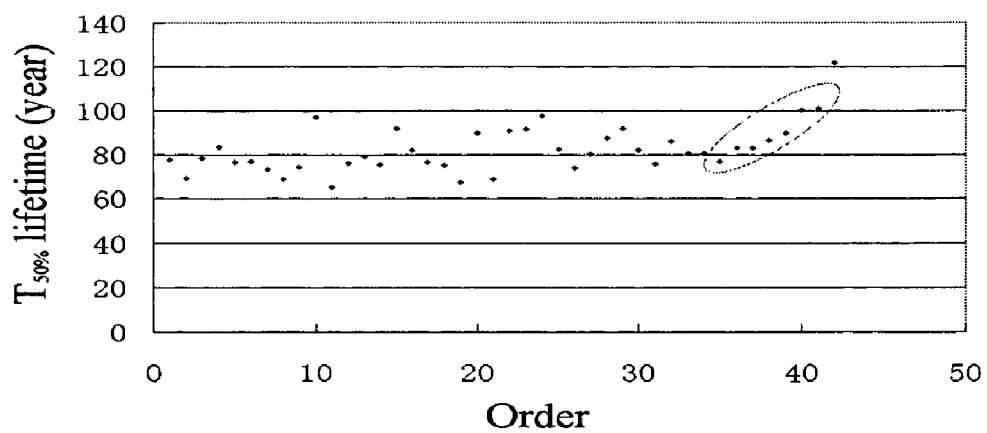
FIG. 7 is a simplified chart applying RAT according to an embodiment of the present invention.

The conventional 6 monotonic increasing trend test rule cannot detect the trend because the third point is slightly lower than the second one (see the circle in FIG. 7). The 7 non-monotonic increasing points inside the circle have total reverse arrangement of R=20 therefore the false alarm rate is 0.00139 (from the table in Appendix). If we include the last point (i.e., the $8^{th}$ point, which is outside the circle) in the calculation, we have R=27 and the corresponding false alarm rate is 0.000198, which is much lower than that from the 7 points (=0.00139). This is reasonable as we have more evidence of such increasing trend. Although the last 6 points are monotonic increasing and that can be detected by the conventional trend test, it is especially crucial for semiconductor manufacturing to identify nonconformance earlier so as to take early actions to fix problems and reduce possible loss, which is comparably higher than other industries. And, our proposed RAT test again shows its superiority over the traditional trend test on earlier detections of the non-monotonic trends.

Figure 8:
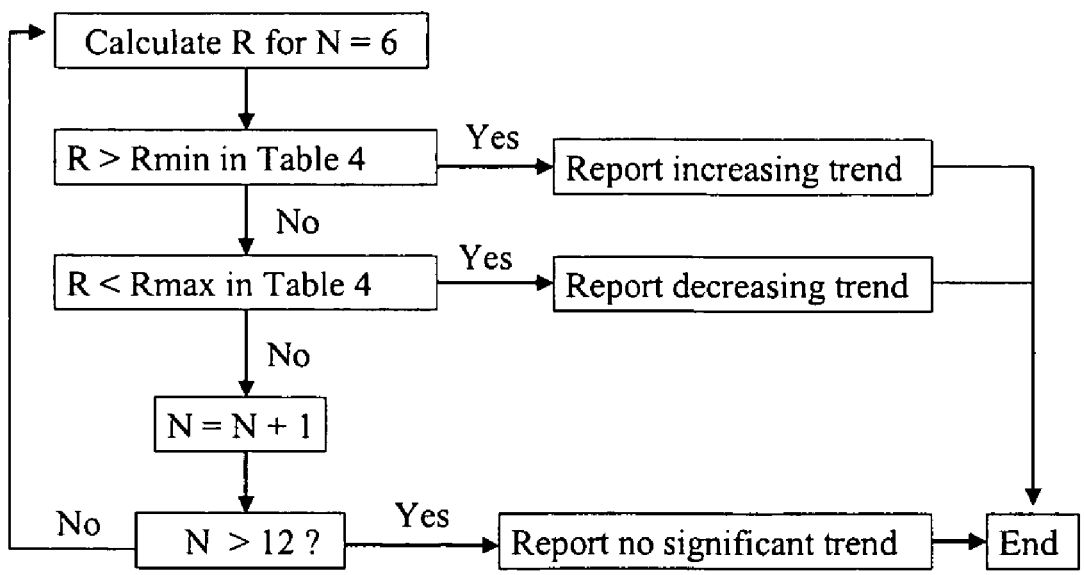
FIG. 8 is a simplified flow chart illustrating a method of RAT according to an embodiment of the present invention.

Heuristic: In SPC practice, we propose to replace the current monotonic trend test with RAT. A computer code is written to automatically implement this at real time and trigger in-line warning if any. The flow chart in FIG. 8 demonstrates our proposed heuristic. The RAT test applies to the latest 6 points first using the criteria in Table 4. If an increasing or decreasing trend is detected, the program stops. Otherwise, the latest 7 points are tested again with RAT (using Table 4). Such loops continue until N (N=2 in FIG. 8) points are tested by the proposed RAT scheme. Whether we shall continue the RAT test for more data points depends on the frequency of data accumulation and on engineering judgments.

It is necessary to point out a very important flaw with this RAT test at a special case when all points under test are identical although the possibility of having such data is very low. According to the definition of reverse arrangement, the total R will be the same as the monotonic decreasing trend, i.e., R=0, which is the possible minimum total reverse arrangement. The RAT will conclude a decreasing trend with false alarm rate same as the monotonic decreasing trend. Obviously, this is a wrong judgment. However, no paper or book on RAT pointed out such flaw. Fortunately, the probability that all observations are identical is extremely low for continuous normal distribution. A straightforward engineering approach to avoid this special case is to first check the control chart for ties. Moreover, we should always keep sufficient number of significant figures of raw data from measurement, which is determined by the precision of measurement. For effective and automatic RAT tests, we should not round off raw data so we have sufficiently precise data to avoid this wrong judgment. In our computer programs, we have checks on the ties. Moreover, if ties occur frequently, we must check if the measurement and data recording are adequate.

In SPC practice, it is desired to establish whether a sequence of observations is statistically trending up or down. The current widely used monotonic increasing or decreasing trend test cannot detect non-monotonic trends. This paper proposes to use RAT to fulfill the needs of detecting non-monotonic trends. The original papers of RAT were detailed reviewed. We identify mistakes and extend the calculations. We replace the current monotonic trend tests by RAT on semiconductor manufacturing and prevent many potential discrepancies on quality as well as on reliability. Real examples on in-line monitors and reliability applications are reported. A heuristic is illustrated for our proposed RAT test procedure, which is successfully implemented by computer codes for automatic detections.

Depending upon the specific embodiment, the system is overseen and controlled by one or more computer systems, including a microprocessor and/controllers. In a preferred embodiment, the computer system or systems include a common bus, oversees and performs operation and processing of information. The system also has a display 121, which can be a computer display, coupled to the control system 380, which will be described in more detail below. Of course, there can be other modifications, alternatives, and variations. Further details of the present system are provided throughout the specification and more particularly below.

Figure 9:
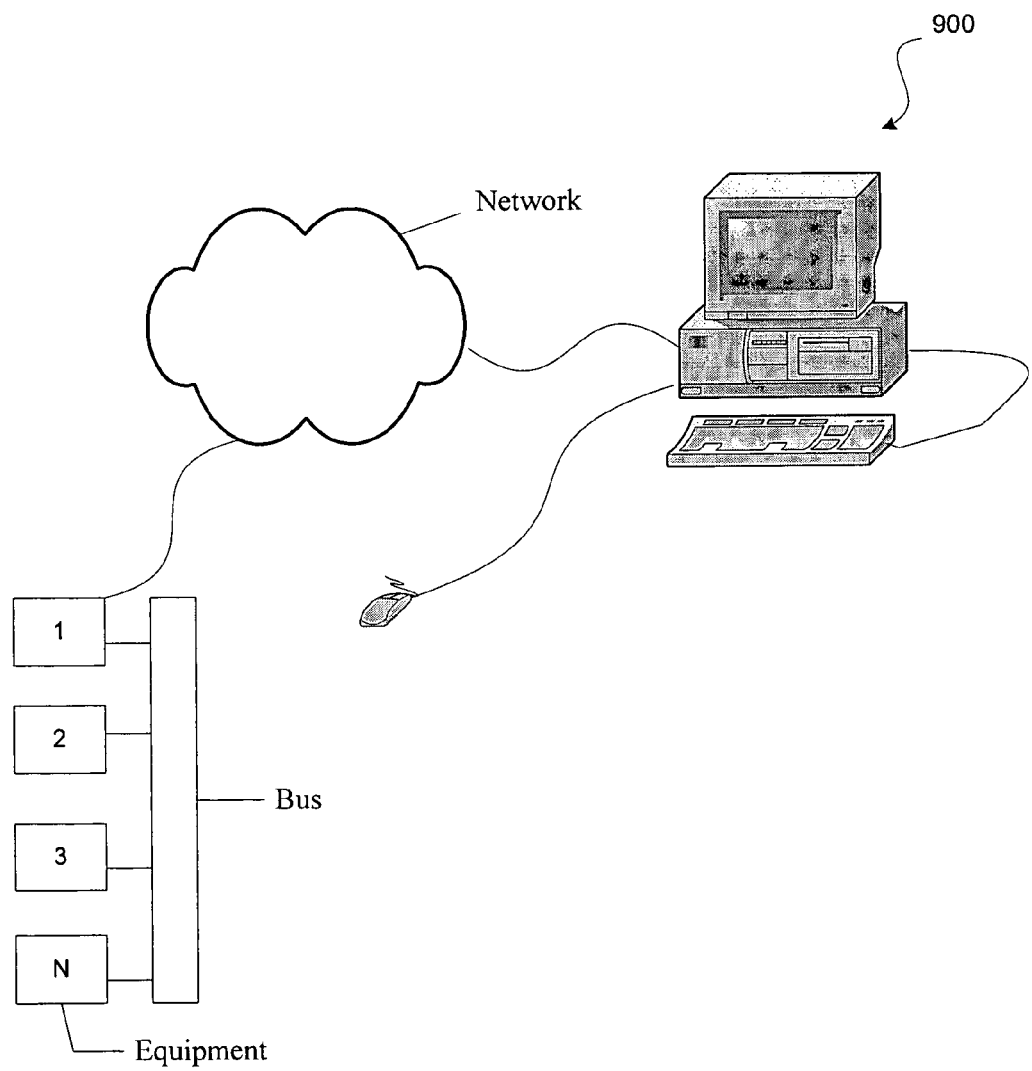
FIG. 9 is a simplified computer system according to an embodiment of the present invention.

FIG. 9 is a simplified diagram of a computer system 900 that is used to oversee the method of FIG. 1 according to an embodiment of the present invention. This diagram is merely an example, which should not unduly limit the scope of the claims herein. One of ordinary skill in the art would recognize many other modifications, alternatives, and variations. As shown, the computer system includes display device, display screen, cabinet, keyboard, scanner and mouse. Mouse and keyboard are representative "user input devices." Mouse includes buttons for selection of buttons on a graphical user interface device. Other examples of user input devices are a touch screen, light pen, track ball, data glove, microphone, and so forth.

The system is merely representative of but one type of system for embodying the present invention. It will be readily apparent to one of ordinary skill in the art that many system types and configurations are suitable for use in conjunction with the present invention. In a preferred embodiment, computer system 900 includes a Pentium™ class based computer, running Windows™ NT operating system by Microsoft Corporation or Linux based systems from a variety of sources. However, the system is easily adapted to other operating systems and architectures by those of ordinary skill in the art without departing from the scope of the present invention. As noted, mouse can have one or more buttons such as buttons. Cabinet houses familiar computer components such as disk drives, a processor, storage device, etc. Storage devices include, but are not limited to, disk drives, magnetic tape, solid-state memory, flash memory, bubble memory, etc. Cabinet can include additional hardware such as input/output (I/O) interface cards for connecting computer system to external devices external storage, other computers or additional peripherals, which are further described below.

Figure 10:
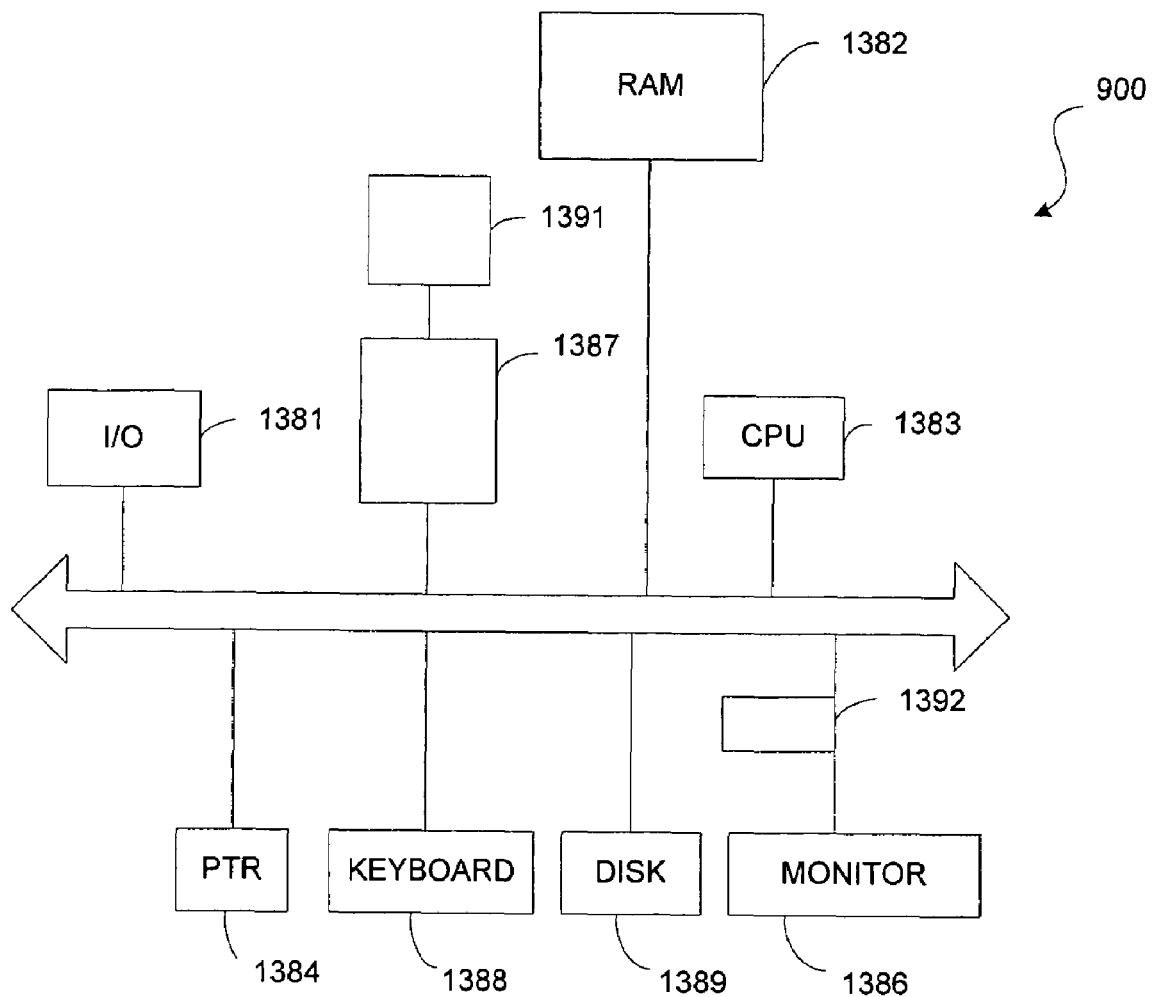
FIG. 10 is a simplified block diagram of a computer system according to an embodiment of the present invention.

FIG. 10 is a more detailed diagram of hardware elements in the computer system according to an embodiment of the present invention. This diagram is merely an example, which should not unduly limit the scope of the claims herein. One of ordinary skill in the art would recognize many other modifications, alternatives, and variations. As shown, basic subsystems are included in computer system 900. In specific embodiments, the subsystems are interconnected via a system bus 1385. Additional subsystems such as a printer 1384, keyboard 1388, fixed disk 1389, monitor 1386, which is coupled to display adapter 1392, and others are shown. Peripherals and input/output (I/O) devices, which couple to I/O controller 1381, can be connected to the computer system by any number of means known in the art, such as serial port 1387. For example, serial port 1387 can be used to connect the computer system to a modem 1391, which in turn connects to a wide area network such as the Internet, a mouse input device, or a scanner. The interconnection via system bus allows central processor 1383 to communicate with each subsystem and to control the execution of instructions from system memory 1382 or the fixed disk 1389, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Although the above has been illustrated in terms of specific hardware features, it would be recognized that many variations, alternatives, and modifications can exist. For example, any of the hardware features can be further combined, or even separated. The features can also be implemented, in part, through software or a combination of hardware and software. The hardware and software can be further integrated or less integrated depending upon the application. Further details of certain methods according to the present invention can be found throughout the present specification and more particularly below.

REFERENCES

1. Shewhart, W. A. (edited and new foreword by Deming, W. E.), Statistical Methods from the Viewpoint of Quality Control, Dover Publications, 1986, New York, USA.
2. Western Electric, Statistical Quality Control Handbook, 1958.
3. Nelson, Lloyd S., "The Shewhart Control Chart-Test of Special Causes," J of Quality Technology, 16(4), 1984, pp. 237-239.
4. M. G. Kendall, "A New Measure of rank Correlation", Biometrika, Vol. 30, pp. 81-93, June 1938.
5. Henry B. Mann, "Nonparametric Tests Against Trend", Econometrica, Vol. 13, No. 3, July, 1945, pp. 245-259.
6. M. G. Kendall, The advanced Theory of Statistics, Vol. 2, Inference and Relationship, 1961.
7. J. I. Ansell and M. J. Phillips, "Practical Methods for Reliability Data Analysis", Oxford Statistical Science Series, Oxford Clarendon Press, p. 142, 1994.
8. FACTORYworks 2.4, BROOKS Automation Inc, 15 Elizabeth Drive, Chelmsford, Mass. 01824, USA., www.brooks.com.
9. Gerald M. Smith, "Statistical Process Control and Quality Improvement", $4^{th}$ Edition, Prentice Hall, p. 394-398, 2001.

APPENDIX

Accumulated frequency and probability for R and Σ for N = 7 to 12

| R | Σ | Prob. (t <= T) | Frequency of Σ | Accumulated Frequency |
|---|---|---|---|---|
| N = 7 | | | | |
| 0 | −21 | 0.00019841 | 1 | 1 |
| 1 | −19 | 0.00138889 | 6 | 7 |
| 2 | −17 | 0.00535714 | 20 | 27 |
| 3 | −15 | 0.01507937 | 49 | 76 |
| 4 | −13 | 0.03452381 | 98 | 174 |
| 5 | −11 | 0.06805556 | 169 | 343 |
| 6 | −9 | 0.11944444 | 259 | 602 |
| 7 | −7 | 0.19067460 | 359 | 961 |
| 8 | −5 | 0.28095238 | 455 | 1416 |
| 9 | −3 | 0.38630952 | 531 | 1947 |
| 10 | −1 | 0.50000000 | 573 | 2520 |
| 11 | 1 | 0.61369048 | 573 | 3093 |
| 12 | 3 | 0.71904762 | 531 | 3624 |
| 13 | 5 | 0.80932540 | 455 | 4079 |
| 14 | 7 | 0.88055556 | 359 | 4438 |
| 15 | 9 | 0.93194444 | 259 | 4697 |
| 16 | 11 | 0.96547619 | 169 | 4866 |
| 17 | 13 | 0.98492063 | 98 | 4964 |
| 18 | 15 | 0.99464286 | 49 | 5013 |
| 19 | 17 | 0.99861111 | 20 | 5033 |
| 20 | 19 | 0.99980159 | 6 | 5039 |
| 21 | 21 | 1.00000000 | 1 | 5040 |
| N = 8 | | | | |
| 0 | −28 | 0.00002480 | 1 | 1 |
| 1 | −26 | 0.00019841 | 7 | 8 |
| 2 | −24 | 0.00086806 | 27 | 35 |
| 3 | −22 | 0.00275298 | 76 | 111 |
| 4 | −20 | 0.00706845 | 174 | 285 |
| 5 | −18 | 0.01557540 | 343 | 628 |
| 6 | −16 | 0.03050595 | 602 | 1230 |
| 7 | −14 | 0.05434028 | 961 | 2191 |
| 8 | −12 | 0.08943452 | 1415 | 3606 |
| 9 | −10 | 0.13754960 | 1940 | 5546 |
| 10 | −8 | 0.19937996 | 2493 | 8039 |
| 11 | −6 | 0.27420635 | 3017 | 11056 |
| 12 | −4 | 0.35977183 | 3450 | 14506 |
| 13 | −2 | 0.45243056 | 3736 | 18242 |
| 14 | 0 | 0.54756944 | 3836 | 22078 |
| 15 | 2 | 0.64022817 | 3736 | 25814 |
| 16 | 4 | 0.72579365 | 3450 | 29264 |
| 17 | 6 | 0.80062004 | 3017 | 32281 |
| 18 | 8 | 0.86245040 | 2493 | 34774 |
| 19 | 10 | 0.91056548 | 1940 | 36714 |
| 20 | 12 | 0.94565972 | 1415 | 38129 |
| 21 | 14 | 0.96949405 | 961 | 39090 |
| 22 | 16 | 0.98442460 | 602 | 39692 |
| 23 | 18 | 0.99293155 | 343 | 40035 |
| 24 | 20 | 0.99724702 | 174 | 40209 |
| 25 | 22 | 0.99913194 | 76 | 40285 |
| 26 | 24 | 0.99980159 | 27 | 40312 |
| 27 | 26 | 0.99997520 | 7 | 40319 |
| 28 | 28 | 1.00000000 | 1 | 40320 |
| N = 9 | | | | |
| 0 | −36 | 0.00000276 | 1 | 1 |
| 1 | −34 | 0.00002480 | 8 | 9 |
| 2 | −32 | 0.00012125 | 35 | 44 |
| 3 | −30 | 0.00042714 | 111 | 155 |
| 4 | −28 | 0.00121252 | 285 | 440 |
| 5 | −26 | 0.00294312 | 628 | 1068 |
| 6 | −24 | 0.00633267 | 1230 | 2298 |
| 7 | −22 | 0.01237022 | 2191 | 4489 |
| 8 | −20 | 0.02230765 | 3606 | 8095 |
| 9 | −18 | 0.03758818 | 5545 | 13640 |
| 10 | −16 | 0.05971947 | 8031 | 21671 |
| 11 | −14 | 0.09009039 | 11021 | 32692 |
| 12 | −12 | 0.12975915 | 14395 | 47087 |
| 13 | −10 | 0.17924383 | 17957 | 65044 |
| 14 | −8 | 0.23835428 | 21450 | 86494 |
| 15 | −6 | 0.30610119 | 24584 | 111078 |
| 16 | −4 | 0.38070712 | 27073 | 138151 |
| 17 | −2 | 0.45972773 | 28675 | 166826 |
| 18 | 0 | 0.54027227 | 29228 | 196054 |
| 19 | 2 | 0.61929288 | 28675 | 224729 |
| 20 | 4 | 0.69389881 | 27073 | 251802 |
| 21 | 6 | 0.76164572 | 24584 | 276386 |
| 22 | 8 | 0.82075617 | 21450 | 297836 |
| 23 | 10 | 0.87024085 | 17957 | 315793 |
| 24 | 12 | 0.90990961 | 14395 | 330188 |
| 25 | 14 | 0.94028053 | 11021 | 341209 |
| 26 | 16 | 0.96241182 | 8031 | 349240 |
| 27 | 18 | 0.97769235 | 5545 | 354785 |
| 28 | 20 | 0.98762952 | 3606 | 358391 |
| 29 | 22 | 0.99366733 | 2191 | 360582 |
| 30 | 24 | 0.99705688 | 1230 | 361812 |
| 31 | 26 | 0.99878748 | 628 | 362440 |
| 32 | 28 | 0.99957286 | 285 | 362725 |
| 33 | 30 | 0.99987875 | 111 | 362836 |
| 34 | 32 | 0.99997520 | 35 | 362871 |
| 35 | 34 | 0.99999724 | 8 | 362879 |
| 36 | 36 | 1.00000000 | 1 | 362880 |
| N = 10 | | | | |
| 0 | −45 | 0.00000028 | 1 | 1 |
| 1 | −43 | 0.00000276 | 9 | 10 |
| 2 | −41 | 0.00001488 | 44 | 54 |
| 3 | −39 | 0.00005759 | 155 | 209 |
| 4 | −37 | 0.00017885 | 440 | 649 |
| 5 | −35 | 0.00047316 | 1068 | 1717 |
| 6 | −33 | 0.00110643 | 2298 | 4015 |
| 7 | −31 | 0.00234347 | 4489 | 8504 |
| 8 | −29 | 0.00457424 | 8095 | 16599 |
| 9 | −27 | 0.00833306 | 13640 | 30239 |
| 10 | −25 | 0.01430473 | 21670 | 51909 |
| 11 | −23 | 0.02331129 | 32683 | 84592 |
| 12 | −21 | 0.03627508 | 47043 | 131635 |
| 13 | −19 | 0.05415675 | 64889 | 196524 |
| 14 | −17 | 0.07787092 | 86054 | 282578 |
| 15 | −15 | 0.10818673 | 110010 | 392588 |
| 16 | −13 | 0.14562417 | 135853 | 528441 |
| 17 | −11 | 0.19035992 | 162337 | 690778 |
| 18 | −9 | 0.24215636 | 187959 | 878737 |
| 19 | −7 | 0.30032683 | 211089 | 1089826 |
| 20 | −5 | 0.36374476 | 230131 | 1319957 |
| 21 | −3 | 0.43090030 | 243694 | 1563651 |
| 22 | −1 | 0.50000000 | 250749 | 1814400 |
| 23 | 1 | 0.56909970 | 250749 | 2065149 |
| 24 | 3 | 0.63625524 | 243694 | 2308843 |
| 25 | 5 | 0.69967317 | 230131 | 2538974 |
| 26 | 7 | 0.75784364 | 211089 | 2750063 |
| 27 | 9 | 0.80964010 | 187959 | 2938022 |
| 28 | 11 | 0.85437583 | 162337 | 3100359 |
| 29 | 13 | 0.89181327 | 135853 | 3236212 |
| 30 | 15 | 0.92212908 | 110010 | 3346222 |
| 31 | 17 | 0.94584325 | 86054 | 3432276 |
| 32 | 19 | 0.96372492 | 64889 | 3497165 |
| 33 | 21 | 0.97668871 | 47043 | 3544208 |
| 34 | 23 | 0.98569527 | 32683 | 3576891 |
| 35 | 25 | 0.99166694 | 21670 | 3598561 |
| 36 | 27 | 0.99542576 | 13640 | 3612201 |
| 37 | 29 | 0.99765653 | 8095 | 3620296 |
| 38 | 31 | 0.99889357 | 4489 | 3624785 |
| 39 | 33 | 0.99952684 | 2298 | 3627083 |
| 40 | 35 | 0.99982115 | 1068 | 3628151 |
| 41 | 37 | 0.99994241 | 440 | 3628591 |
| 42 | 39 | 0.99998512 | 155 | 3628746 |
| 43 | 41 | 0.99999724 | 44 | 3628790 |
| 44 | 43 | 0.99999972 | 9 | 3628799 |
| 45 | 45 | 1.00000000 | 1 | 3628800 |
| N = 11 | | | | |
| 0 | −55 | 0.00000003 | 1 | 1 |
| 1 | −53 | 0.00000028 | 10 | 11 |
| 2 | −51 | 0.00000163 | 54 | 65 |
| 3 | −49 | 0.00000686 | 209 | 274 |

APPENDIX-continued

Accumulated frequency and probability for R and Σ for N = 7 to 12

| R | Σ | Prob. (t <= T) | Frequency of Σ | Accumulated Frequency |
|---|---|---|---|---|
| 4 | −47 | 0.00002312 | 649 | 923 |
| 5 | −45 | 0.00006614 | 1717 | 2640 |
| 6 | −43 | 0.00016672 | 4015 | 6655 |
| 7 | −41 | 0.00037976 | 8504 | 15159 |
| 8 | −39 | 0.00079560 | 16599 | 31758 |
| 9 | −37 | 0.00155316 | 30239 | 61997 |
| 10 | −35 | 0.00285359 | 51909 | 113906 |
| 11 | −33 | 0.00497277 | 84591 | 198497 |
| 12 | −31 | 0.00827025 | 131625 | 330122 |
| 13 | −29 | 0.01319224 | 196470 | 526592 |
| 14 | −27 | 0.02026618 | 282369 | 808961 |
| 15 | −25 | 0.03008508 | 391939 | 1200900 |
| 16 | −23 | 0.04328062 | 526724 | 1727624 |
| 17 | −21 | 0.06048548 | 686763 | 2414387 |
| 18 | −19 | 0.08228666 | 870233 | 3284620 |
| 19 | −17 | 0.10917326 | 1073227 | 4357847 |
| 20 | −15 | 0.14148341 | 1289718 | 5647565 |
| 21 | −13 | 0.17935573 | 1511742 | 7159307 |
| 22 | −11 | 0.22269107 | 1729808 | 8889115 |
| 23 | −9 | 0.27112967 | 1933514 | 10822629 |
| 24 | −7 | 0.32404772 | 2112319 | 12934948 |
| 25 | −5 | 0.38057520 | 2256396 | 15191344 |
| 26 | −3 | 0.43963492 | 2357475 | 17548819 |
| 27 | −1 | 0.50000000 | 2409581 | 19958400 |
| 28 | 1 | 0.56036508 | 2409581 | 22367981 |
| 29 | 3 | 0.61942480 | 2357475 | 24725456 |
| 30 | 5 | 0.67595228 | 2256396 | 26981852 |
| 31 | 7 | 0.72887033 | 2112319 | 29094171 |
| 32 | 9 | 0.77730893 | 1933514 | 31027685 |
| 33 | 11 | 0.82064427 | 1729808 | 32757493 |
| 34 | 13 | 0.85851659 | 1511742 | 34269235 |
| 35 | 15 | 0.89082674 | 1289718 | 35558953 |
| 36 | 17 | 0.91771334 | 1073227 | 36632180 |
| 37 | 19 | 0.93951452 | 870233 | 37502413 |
| 38 | 21 | 0.95671938 | 686763 | 38189176 |
| 39 | 23 | 0.96991492 | 526724 | 38715900 |
| 40 | 25 | 0.97973382 | 391939 | 39107839 |
| 41 | 27 | 0.98680776 | 282369 | 39390208 |
| 42 | 29 | 0.99172975 | 196470 | 39586678 |
| 43 | 31 | 0.99502723 | 131625 | 39718303 |
| 44 | 33 | 0.99714641 | 84591 | 39802894 |
| 45 | 35 | 0.99844684 | 51909 | 39854803 |
| 46 | 37 | 0.99920440 | 30239 | 39885042 |
| 47 | 39 | 0.99962024 | 16599 | 39901641 |
| 48 | 41 | 0.99983328 | 8504 | 39910145 |
| 49 | 43 | 0.99993386 | 4015 | 39914160 |
| 50 | 45 | 0.99997688 | 1717 | 39915877 |
| 51 | 47 | 0.99999314 | 649 | 39916526 |
| 52 | 49 | 0.99999837 | 209 | 39916735 |
| 53 | 51 | 0.99999972 | 54 | 39916789 |
| 54 | 53 | 0.99999997 | 10 | 39916799 |
| 55 | 55 | 1.00000000 | 1 | 39916800 |

N = 12

| R | Σ | Prob. (t <= T) | Frequency of Σ | Accumulated Frequency |
|---|---|---|---|---|
| 0 | −66 | 0.00000000 | 1 | 1 |
| 1 | −64 | 0.00000003 | 11 | 12 |
| 2 | −62 | 0.00000016 | 65 | 77 |
| 3 | −60 | 0.00000073 | 274 | 351 |
| 4 | −58 | 0.00000266 | 923 | 1274 |
| 5 | −56 | 0.00000817 | 2640 | 3914 |
| 6 | −54 | 0.00002206 | 6655 | 10569 |
| 7 | −52 | 0.00005371 | 15159 | 25728 |
| 8 | −50 | 0.00012001 | 31758 | 57486 |
| 9 | −48 | 0.00024944 | 61997 | 119483 |
| 10 | −46 | 0.00048724 | 113906 | 233389 |
| 11 | −44 | 0.00090164 | 198497 | 431886 |
| 12 | −42 | 0.00159082 | 330121 | 762007 |
| 13 | −40 | 0.00269015 | 526581 | 1288588 |
| 14 | −38 | 0.00437887 | 808896 | 2097484 |
| 15 | −36 | 0.00688538 | 1200626 | 3298110 |
| 16 | −34 | 0.01049018 | 1726701 | 5024811 |
| 17 | −32 | 0.01552512 | 2411747 | 7436558 |
| 18 | −30 | 0.02236845 | 3277965 | 10714523 |
| 19 | −28 | 0.03143457 | 4342688 | 15057211 |
| 20 | −26 | 0.04315856 | 5615807 | 20673018 |
| 21 | −24 | 0.05797544 | 7097310 | 27770328 |
| 22 | −22 | 0.07629523 | 8775209 | 36545537 |
| 23 | −20 | 0.09847497 | 10624132 | 47169669 |
| 24 | −18 | 0.12478976 | 12604826 | 59774495 |
| 25 | −16 | 0.15540501 | 14664752 | 74439247 |
| 26 | −14 | 0.19035240 | 16739858 | 91179105 |
| 27 | −12 | 0.22951198 | 18757500 | 109936605 |
| 28 | −10 | 0.27260235 | 20640357 | 130576962 |
| 29 | −8 | 0.31918063 | 22311069 | 152888031 |
| 30 | −6 | 0.36865276 | 23697232 | 176585263 |
| 31 | −4 | 0.42029418 | 24736324 | 201321587 |
| 32 | −2 | 0.47327964 | 25380120 | 226701707 |
| 33 | 0 | 0.52672036 | 25598186 | 252299893 |
| 34 | 2 | 0.57970582 | 25380120 | 277680013 |
| 35 | 4 | 0.63134724 | 24736324 | 302416337 |
| 36 | 6 | 0.68081937 | 23697232 | 326113569 |
| 37 | 8 | 0.72739765 | 22311069 | 348424638 |
| 38 | 10 | 0.77048802 | 20640357 | 369064995 |
| 39 | 12 | 0.80964760 | 18757500 | 387822495 |
| 40 | 14 | 0.84459499 | 16739858 | 404562353 |
| 41 | 16 | 0.87521024 | 14664752 | 419227105 |
| 42 | 18 | 0.90152503 | 12604826 | 431831931 |
| 43 | 20 | 0.92370477 | 10624132 | 442456063 |
| 44 | 22 | 0.94202456 | 8775209 | 451231272 |
| 45 | 24 | 0.95684144 | 7097310 | 458328582 |
| 46 | 26 | 0.96856543 | 5615807 | 463944389 |
| 47 | 28 | 0.97763155 | 4342688 | 468287077 |
| 48 | 30 | 0.98447488 | 3277965 | 471565042 |
| 49 | 32 | 0.98950982 | 2411747 | 473976789 |
| 50 | 34 | 0.99311462 | 1726701 | 475703490 |
| 51 | 36 | 0.99562113 | 1200626 | 476904116 |
| 52 | 38 | 0.99730985 | 808896 | 477713012 |
| 53 | 40 | 0.99840918 | 526581 | 478239593 |
| 54 | 42 | 0.99909836 | 330121 | 478569714 |
| 55 | 44 | 0.99951276 | 198497 | 478768211 |
| 56 | 46 | 0.99975056 | 113906 | 478882117 |
| 57 | 48 | 0.99987999 | 61997 | 478944114 |
| 58 | 50 | 0.99994629 | 31758 | 478975872 |
| 59 | 52 | 0.99997794 | 15159 | 478991031 |
| 60 | 54 | 0.99999183 | 6655 | 478997686 |
| 61 | 56 | 0.99999734 | 2640 | 479000326 |
| 62 | 58 | 0.99999927 | 923 | 479001249 |
| 63 | 60 | 0.99999984 | 274 | 479001523 |
| 64 | 62 | 0.99999997 | 65 | 479001588 |
| 65 | 64 | 1.00000000 | 11 | 479001599 |
| 66 | 66 | 1.00000000 | 1 | 479001600 |

The disclosures and the description herein are purely illustrative and are not to be limited with the above examples. A person skilled in reliability engineering and reliability statistics would be able to apply the method disclosed in the above embodiments to his/her particular product, component or system in reliability testing. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for manufacturing semiconductor devices, the method comprising:

providing a process associated with a manufacture of a semiconductor device;

collecting a plurality information having a non-monotonic trend of at least one parameter associated with the process over a determined period;

processing the plurality of information having the non-monotonic trend;

detecting an increasing or a decreasing non-monotonic trend from the processed plurality of information having the non-monotonic trend; and performing an action based upon at least the detected increasing or decreasing non-monotonic trend, thereby controlling the process associated with the manufacture of the semiconductor device; and outputting the detected increasing or decreasing non-monotonic trend if the detected trend is within a predetermined false alarm rate.

2. The method of claim 1 wherein the determined period comprises a time period.

3. The method of claim 1 wherein the determined period comprises a spatial frequency.

4. The method of claim 1 wherein the processing and detecting comprises a reverse arrangement test.

5. The method of claim 1 wherein the processing and detecting comprises a randomness test.

6. The method of claim 1 wherein the processing and detecting is called a Cox-Stuart test.

7. The method of claim 1 wherein the reverse arrangement test comprises determining a number of data points, process the plurality of information for the data points.

8. The method of claim 7 further comprising adding the number of data points by one, and processing the plurality of data points.

9. The method of claim 8 further comprising reporting no change.

10. The method of claim 1 wherein if the detected non-monotonic trend is outside of the predetermined false alarm rate, add one more sample and continue to process.

11. A system for manufacturing semiconductor devices, the system comprising one or more memories, the one or more memories:

one or more codes directed to initiating a process associated with a manufacture of a semiconductor device;

one or more codes directed to collecting a plurality information having a non-monotonic trend of at least one parameter associated with the process over a determined period;

one or more codes directed to processing the plurality of information having the non-monotonic trend;

one or more codes directed to detecting an increasing or a decreasing non-monotonic trend from the processed plurality of information having the non-monotonic trend; and one or more codes directed to outputting a code to perform an action based upon at least the detected increasing or decreasing non-monotonic trend, thereby controlling the process associated with the manufacture of the semiconductor device; and one or more codes directed to output the detected increasing or decreasing non-monotonic trend if the detected trend is within a predetermined false alarm rate.

12. The system of claim 11 wherein the determined period comprises a time period.

13. The system of claim 11 wherein the determined period comprises a spatial frequency.

14. The system of claim 11 wherein the processing and detecting comprises a reverse arrangement test.

15. The system of claim 11 wherein the processing and detecting comprises a randomness test.

16. The system of claim 11 wherein the processing and detecting is called a Cox-Stuart test.

17. The system of claim 11 wherein the reverse arrangement test comprises determining a number of data points, process the plurality of information for the data points.

18. The system of claim 17 further comprising adding the number of data points by one, and processing the plurality of data points.

19. The system of claim 18 further comprising reporting no change.

20. The system of claim 11 wherein if the detected non-monotonic trend is outside of the predetermined false alarm rate, add one more sample and continue to process.

* * * * *